(12) United States Patent
Yamada (10) Patent No.: US 9,701,471 B2
(45) Date of Patent: Jul. 11, 2017

(54) TRANSFER DEVICE

(71) Applicant: Murata Machinery, Ltd., Kyoto-shi, Kyoto (JP)

(72) Inventor: Fumie Yamada, Inuyama (JP)

(73) Assignee: MURATA MACHINERY, LTD., Kyoto-Shi (JP)

( * ) Notice: Subject to any disclaimer, the term of this patent is extended or adjusted under 35 U.S.C. 154(b) by 57 days.

(21) Appl. No.: 14/423,403

(22) PCT Filed: Apr. 16, 2013

(86) PCT No.: PCT/JP2013/061306
§ 371 (c)(1),
(2) Date: Feb. 23, 2015

(87) PCT Pub. No.: WO2014/034174
PCT Pub. Date: Mar. 6, 2014

(65) Prior Publication Data
US 2015/0259141 A1 Sep. 17, 2015

(30) Foreign Application Priority Data
Aug. 31, 2012 (JP) .............................. P2012-191984

(51) Int. Cl.
*B66F 9/14* (2006.01)
*B65G 1/04* (2006.01)
*B65G 65/08* (2006.01)

(52) U.S. Cl.
CPC ......... *B65G 1/0407* (2013.01); *B65G 1/0435* (2013.01); *B65G 65/08* (2013.01); *B66F 9/141* (2013.01); *B65G 2201/025* (2013.01)

(58) Field of Classification Search
CPC ..... B65G 1/0407; B65G 1/0435; B66F 9/141; B66F 9/143
See application file for complete search history.

(56) References Cited

U.S. PATENT DOCUMENTS 5,839,872 A * 11/1998 Goto ....................... B66F 9/141
414/277
7,128,521 B2 * 10/2006 Hansl ................... B65G 1/0435
414/807

(Continued)

FOREIGN PATENT DOCUMENTS

EP 0733563 A1 * 9/1996 ........... B65G 1/0435
EP 1772400 A1 * 4/2007 ........... B65G 1/0407

(Continued)

*Primary Examiner* — James Keenan
(74) *Attorney, Agent, or Firm* — DLA Piper LLP (US)

(57) ABSTRACT

A transferring apparatus includes an elevating platform, a pair of side arms that are placed on the elevating platform and are each capable of stretching toward and retracting from both sides of a package, and a lower conveyor that is placed on the elevating platform. At least either one of the pair of the side arms is movable in a left-and-right direction orthogonal to a stretching-and-retracting direction of the side arm. The side arm that is movable in the left-and-right direction includes a base member that is movable in the left-and-right direction. The base member of the side arm includes a front guide leg-member and a rear guide leg-member that are provided to respective ends in the stretching-and-retracting direction of the base member on the lower side thereof. The lower conveyor is provided below a base body member between the front guide leg-member and the rear guide leg-member.

3 Claims, 8 Drawing Sheets

(56) References Cited

U.S. PATENT DOCUMENTS

| | | | |
|---|---|---|---|
| 7,137,770 B2 * | 11/2006 | Ueda | B65G 1/0435 414/274 |
| 8,596,952 B2 * | 12/2013 | Wolkerstorfer | B65G 1/0435 414/280 |
| 8,740,542 B2 * | 6/2014 | Wolkerstorfer | B65G 1/0435 414/280 |
| 8,790,061 B2 * | 7/2014 | Yamashita | B65G 1/0492 414/280 |
| 9,365,347 B2 * | 6/2016 | Nakamura | B65G 1/0407 |
| 9,446,899 B2 * | 9/2016 | Yamada | B65G 1/0407 |
| 2006/0245862 A1 * | 11/2006 | Hansl | B65G 1/0435 414/281 |
| 2006/0285947 A1 * | 12/2006 | Hansl | B65G 1/0407 414/277 |
| 2007/0144991 A1 * | 6/2007 | Hansl | B65G 1/0407 211/121 |
| 2015/0203294 A1 * | 7/2015 | Yamada | B65G 1/0407 294/81.6 |
| 2015/0203295 A1 * | 7/2015 | Nakamura | B65G 1/0435 414/274 |
| 2015/0321845 A1 * | 11/2015 | Nakamura | B65G 1/0435 414/273 |

FOREIGN PATENT DOCUMENTS

| | | | |
|---|---|---|---|
| JP | 10-181809 | 7/1998 | |
| JP | 2946281 B2 * | 9/1999 | B65G 1/0435 |
| JP | 2010-163215 A | 7/2010 | |
| JP | 2011-207616 A | 10/2011 | |
| JP | 2011-225373 | 11/2011 | |
| JP | 2012-071929 | 4/2012 | |
| JP | 2012-071931 | 4/2012 | |
| WO | WO 94/04447 A1 * | 3/1994 | B65G 1/0407 |
| WO | WO 2011/158422 A1 * | 12/2011 | B65G 1/0407 |

* cited by examiner

FRONT ← → REAR

TRANSFER DEVICE

CROSS REFERENCE TO RELATED APPLICATIONS

This application is a national stage of international application PCT/JP2013/061306, filed on Apr. 16, 2013, and claims the benefit of priority under 35 USC 119 of Japanese application 2012-191984, filed on Aug. 31, 2012, which are incorporated herein by reference.

TECHNICAL FIELD

The present invention relates to a transferring apparatus that transfers objects to be conveyed.

BACKGROUND ART

Conventionally, a transferring apparatus provided with side arms has been available. This transferring apparatus stretches the respective side arms in a pair to both sides of an object to be conveyed placed on a rack, for example, hooks both sides of the object with the pair of the side arms or catches the object with the pair of the side arms, and retracts the side arms to transfer the object to the transferring apparatus. A transferring apparatus is known that is provided with a conveyor to smoothly pass objects to be conveyed between racks and the transferring apparatus, for example (see Patent Literature 1, for example).

CITATION LIST

Patent Literature

[Patent Literature 1] Japanese Patent Application Laid-Open Publication No. 2012-71931

SUMMARY OF INVENTION

Technical Problem

In a transferring apparatus, the distance between a pair of side arms may be changed in accordance with the size of an object to be conveyed. In a transferring apparatus described in Patent Literature 1, for example, because a conveyor is arranged between a pair of side arms, the distance between the side arms cannot be made smaller than the width of the conveyor, so that the movable range of the side arms is limited. Accordingly, transferring apparatuses having side arms with a wider movable range are required.

In view of this, the present invention aims to provide a transferring apparatus having side arms with a wider movable range.

Solution to Problem

A transferring apparatus according to one aspect of the present invention includes a body portion, a pair of side arms that are placed on the body portion and are each capable of stretching toward and retracting from both sides of an object to be conveyed, and a lower conveyor that is placed on the body portion. At least either one of the pair of the side arms is movable in a left-and-right direction orthogonal to a stretching-and-retracting direction of the side arms. The side arm that is movable in the left-and-right direction includes a base member that is movable in the left-and-right direction and a telescopic member that advances from and retreats to the base member in the stretching-and-retracting direction. The base member includes: a base body member that supports the telescopic member; guide leg-members that are provided to respective ends in the stretching-and-retracting direction of the base body member on the lower side thereof; guide blocks that are attached to the guide leg-members; a movement leg-member that is provided to the base body member on the lower side thereof between the guide leg-members; and a nut provided to the movement leg-member. The body portion includes: guide rails that are provided to respective ends in the stretching-and-retracting direction of the body portion, extend in the left-and-right direction, and slidably engage with the guide blocks; a screw that is provided between the guide rails, extends in the left-and-right direction, and threadably engages with the nut; and a motor that is connected to the screw. The lower conveyor is provided below the base body member between the guide leg-members.

In this transferring apparatus, because the lower conveyor is provided below the base body member between the guide leg-members, the telescopic member passes above the lower conveyor when the base member that is movable is moved in the left-and-right direction. Accordingly, the distance between the side arms can be changed in accordance with the sizes of objects to be conveyed, for example, without being limited by the lower conveyor, so that the movable range of the side arms can be widened. Because the guide leg-members supporting the side arms are provided to both ends in the stretching-and-retracting direction of the base body member, an object to be conveyed can be stably transferred without the side arms being bent when the object is transferred.

It is preferable that the lower conveyor be provided in a quantity of two with the movement leg-member interposed therebetween along the stretching-and-retracting direction, and the screw be provided below and between the lower conveyors. Providing the screw below and between the lower conveyors in this manner allows the length in the stretching-and-retracting direction of the movement leg-member positioned between the lower conveyors to be shortened, so that the two lower conveyors can be arranged closer to each other. This closer arrangement enables also the conveying surfaces of the two lower conveyors to be closer to each other, and thus an object to be conveyed can be smoothly passed between the lower conveyors.

It is preferable that each of the side arms be provided with two light-emitting sensors, and cases of the two light-emitting sensors partially overlap each other in a vertical direction when the light-emitting sensors are viewed from the stretching-and-retracting direction. In this situation, the two light-emitting sensors can be arranged in a smaller space in the vertical direction than when the two light-emitting sensors are arranged so as not to overlap each other in the vertical direction. Thus, the vertical size of the side arms each provided with two light-emitting sensors can be reduced.

Advantageous Effects of Invention

According to one aspect of the present invention, the movable range of side arms can be widened.

BRIEF DESCRIPTION OF DRAWINGS

FIG. 5 includes diagrams illustrating stretching and retracting states of side arms, in which FIG. 5A illustrates a state of the arms being retracted, FIG. 5B illustrates a state of the arms being stretched forward, and FIG. 5C illustrates a state of the arms being stretched rearward.

FIG. 8 includes diagrams illustrating arrangement of pinion gears, in which FIG. 8A is a diagram of the pinion gears when viewed from the side and FIG. 8B is a top view illustrating positions where motors are installed.

DESCRIPTION OF EMBODIMENTS

Figure 1:
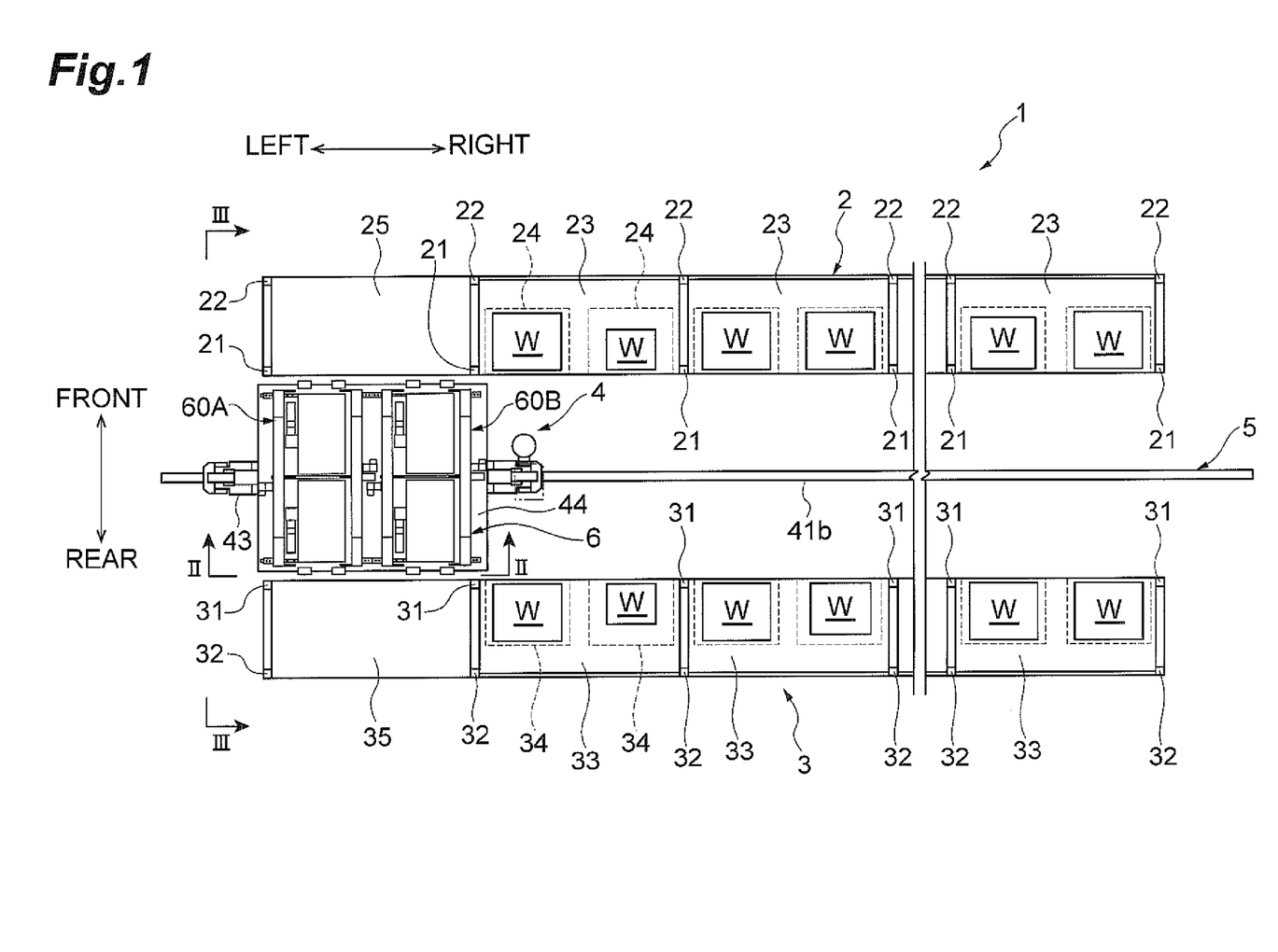
FIG. 1 is a schematic plan view of an automated warehouse according to one embodiment to which a transferring apparatus is applied.

One embodiment of an automated warehouse to which a transferring apparatus of the present invention is applied will be described with reference to the drawings. In the present embodiment, as depicted in FIG. 1, directions will be explained on the assumption that the right side and the left side of the left-and-right direction in FIG. 1 are respectively defined as "right" and "left", where the left-and-right direction is a moving direction of a transferring apparatus 6. As depicted in FIG. 1, the directions will be explained on the assumption that, when the right side is viewed from the transferring apparatus 6, the left side is defined as "front" and the right side is defined as "rear". In other words, the left-and-right direction and the front-and-rear direction are orthogonal to each other.

(Overall Structure of Automated Warehouse)

As depicted in FIG. 1, this automated warehouse 1 includes a front rack 2, a rear rack 3, and a stacker crane 4 that travels therebetween.

(Racks)

The front rack 2 and the rear rack 3 are respectively arranged at front and rear positions with respect to a traveling path 5 for the stacker crane 4 extending in the left-and-right direction so as to sandwich the traveling path 5. The front rack 2 includes a plurality of first posts 21 that are arranged at certain intervals along the traveling path 5, a plurality of second posts 22 that are arranged at the certain intervals along the traveling path 5 in positions more apart from the traveling path 5 than the first posts 21, and a plurality of shelves 23 that are disposed across between adjacent ones of the first posts 21 and the second posts 22. The shelves 23 are arranged in plurality along the left-and-right direction and also arranged in plurality along the height direction of the front rack 2. The rear rack 3 includes a plurality of first posts 31 that are arranged at the certain intervals along the traveling path 5, a plurality of second posts 32 that are arranged at the certain intervals along the traveling path 5 in positions more apart from the traveling path 5 than the first posts 31, and a plurality of shelves 33 that are disposed across between adjacent ones of the first posts 31 and the second posts 32. The shelves 33 are arranged in plurality along the left-and-right direction and also arranged in plurality along the height direction of the rear rack 3.

On each of the shelves 23, two storage sections 24 are formed along the left-and-right direction. Packages (objects to be conveyed) W can be stored in the storage sections 24. Specifically, two packages W can be placed along the left-and-right direction on each of the shelves 23. On each of the shelves 33, two storage sections 34 are formed along the left-and-right direction. Packages (objects to be conveyed) W can be stored in the storage sections 34. Specifically, two packages W can be placed along the left-and-right direction on each of the shelves 33.

At the lowest stage on the left side of the front rack 2, a receiving station 25 for receiving packages W is provided. At the lowest stage on the left side of the rear rack 3, a shipping station 35 for shipping packages W is provided. In the receiving station 25 and the shipping station 35 also, two packages W arranged along the left-and-right direction can be received and shipped.

(Stacker Crane)

Figure 2:
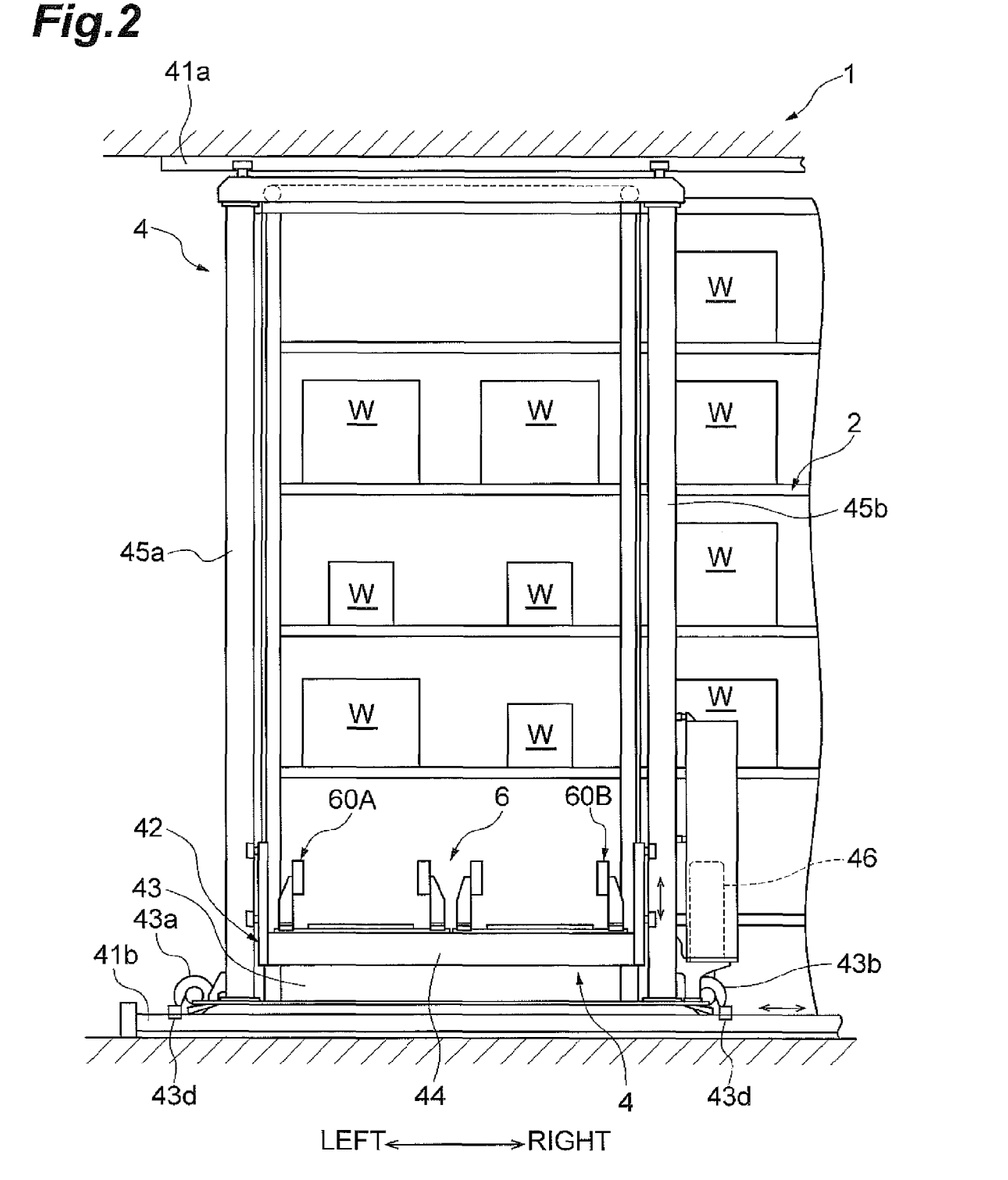
FIG. 2 is a sectional diagram taken along the line II-II of FIG. 1.
Figure 3:
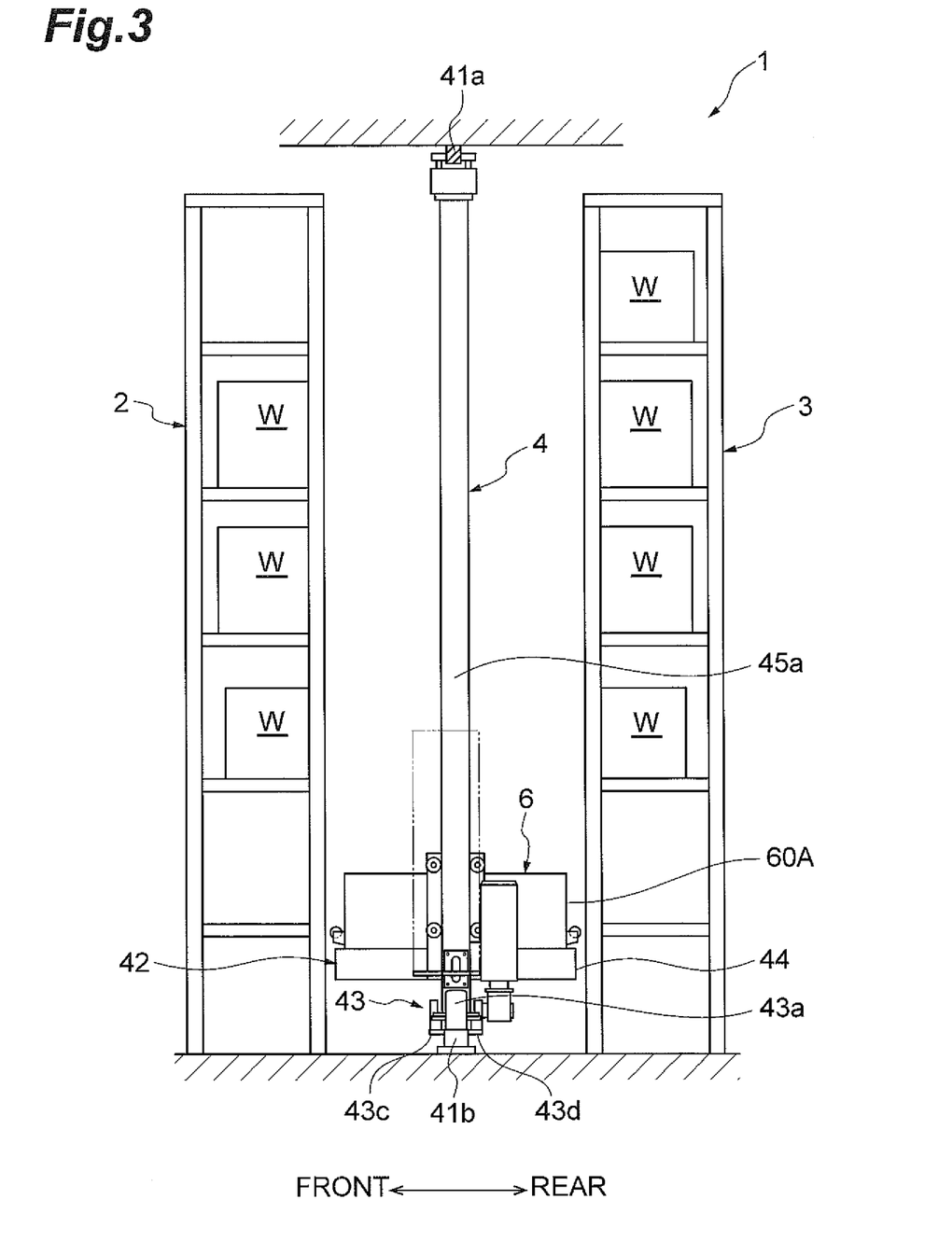
FIG. 3 is a sectional diagram taken along the line III-III of FIG. 1.

As depicted in FIGS. 1 to 3, on the ceiling and the floor of the warehouse, for example, an upper guide rail 41a and a lower guide rail 41b that extend along the traveling path 5 are respectively provided. With the upper guide rail 41a and the lower guide rail 41b, the stacker crane 4 is guided in a movable manner in the left-and-right direction. The stacker crane 4 conveys packages W between the receiving station 25, the storage sections 24, the storage sections 34, and the shipping station 35.

As depicted in FIGS. 2 and 3, the stacker crane 4 includes a traveling vehicle 42 having a vehicle body 43 and an elevating platform (body portion) 44 and the transferring apparatus 6 provided on the elevating platform 44. The vehicle body 43 is provided with a left traveling wheel 43a and a right traveling wheel 43b at the respective ends thereof in the left-and-right direction. The left traveling wheel 43a and the right traveling wheel 43b are rotatably supported by bearings provided to the vehicle body 43, and travel on the lower guide rail 41b. The vehicle body 43 is provided, at both ends thereof in the left-and-right direction, with a front guide roller 43c and a rear guide roller 43d that sandwich the lower guide rail 41b respectively from front and rear sides. With the front guide roller 43c and the rear guide roller 43d, the transferring apparatus 6 is guided along the lower guide rail 41b. The right traveling wheel 43b is driven by a motor 46 for traveling.

On the vehicle body 43, a left mast 45a and right mast 45b are fixed inside the left traveling wheel 43a and the right traveling wheel 43b. The left mast 45a and the right mast 45b extend in the height direction of the front rack 2 and the rear rack 3. The elevating platform 44 is elevatably mounted on the left mast 45a and the right mast 45b provided on the vehicle body 43. The transferring apparatus 6 is placed on the elevating platform 44.

(Transferring Apparatus)

Figure 4:
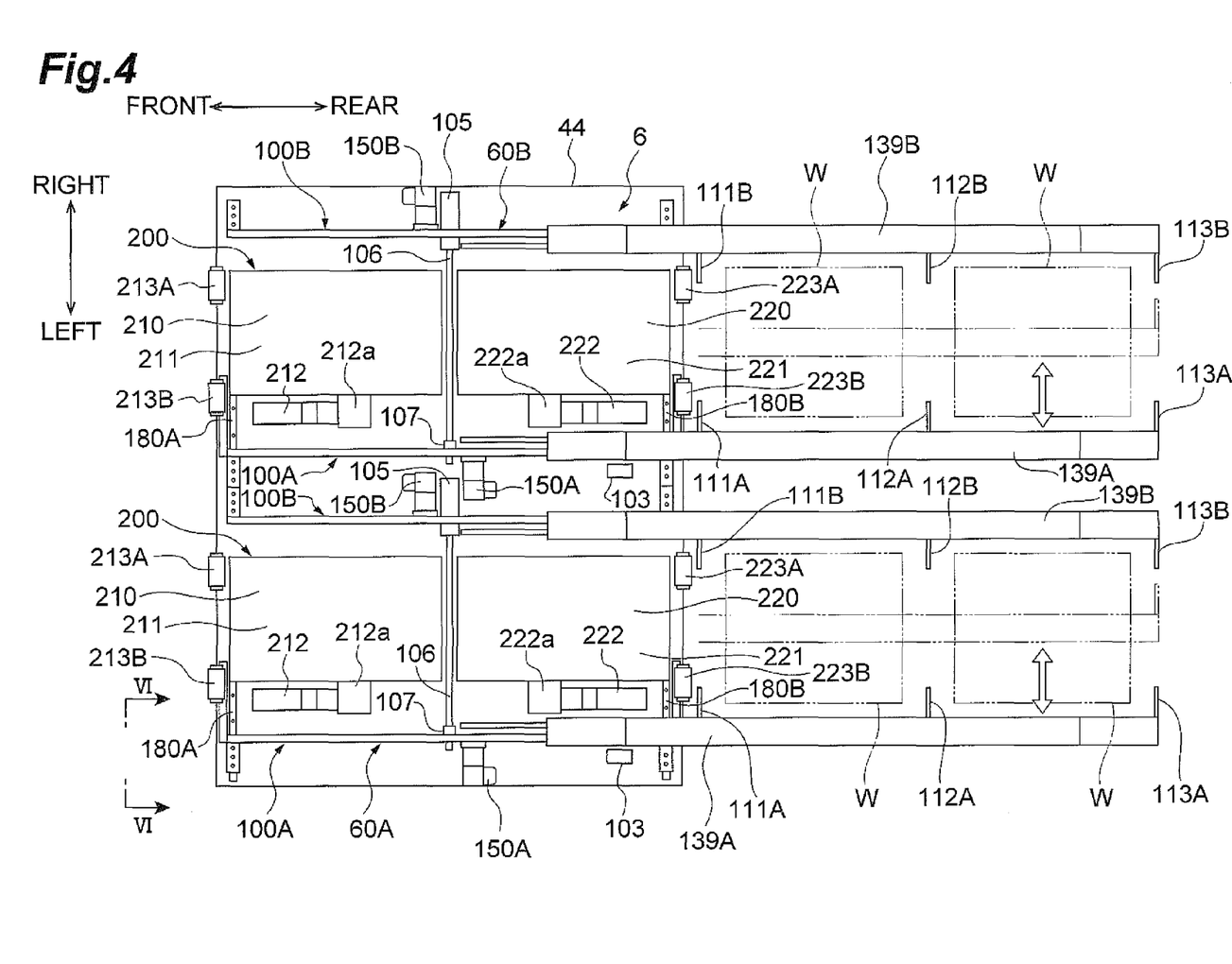
FIG. 4 is a schematic plan view of the transferring apparatus.

The transferring apparatus 6 includes a side-arm transfer unit 60A and a side-arm transfer unit 60B as depicted in FIG. 4. The side-arm transfer unit 60A and the side-arm transfer unit 60B each are placed on the elevating platform 44 along the left-and-right direction. The side-arm transfer unit 60A is arranged on the left side of the side-arm transfer unit 60B. The side-arm transfer unit 60A and the side-arm transfer unit 60B each transfer packages W between the stacker crane 4, the receiving station 25, the storage sections 24, the storage sections 34, and the shipping station 35.

The side-arm transfer unit 60B is configured the same as the side-arm transfer unit 60A. Thus, only the respective components of the side-arm transfer unit 60A will be described in detail. Because the respective components of the side-arm transfer unit 60B are given the same reference signs as reference signs used for the description of the respective components of the side-arm transfer unit 60A, detail description of the side-arm transfer unit 60B is omitted.

The side-arm transfer unit 60A includes a left side arm 100A and a right side arm 100B that are paired with each other and a lower conveyor 200.

(Lower Conveyor)

The lower conveyor 200 includes a front conveyor 210 and a rear conveyor 220 as depicted in FIG. 4. The front conveyor 210 and the rear conveyor 220 are arranged with a certain gap therebetween along the front-and-rear direction. The front conveyor 210 is arranged on the front side of the rear conveyor 220. The front conveyor 210 includes an endless belt 211 and a drive motor 212. The endless belt 211 is driven by the drive motor 212 so that packages W placed on the upper surface of the endless belt 211 can be conveyed in the front-and-rear direction. The drive motor 212 is arranged so that the rotating shaft thereof is aligned in the front-and-rear direction. To the distal end of the rotating shaft of the drive motor 212, an adapter 212a for changing the direction of the rotating shaft by 90 degrees is attached. The adapter 212a changes the direction of the rotating shaft of the drive motor 212 by 90 degrees. The endless belt 211 is driven by the drive motor 212 the direction of the rotating shaft of which is changed 90 degrees by the adapter 212a.

The rear conveyor 220 includes an endless belt 221, a drive motor 222, and an adapter 222a. Because the endless belt 221, the drive motor 222, and the adapter 222a are respectively configured the same as the endless belt 211, the drive motor 212, and the adapter 212a of the front conveyor 210, detail explanation thereof is omitted.

Figure 7:
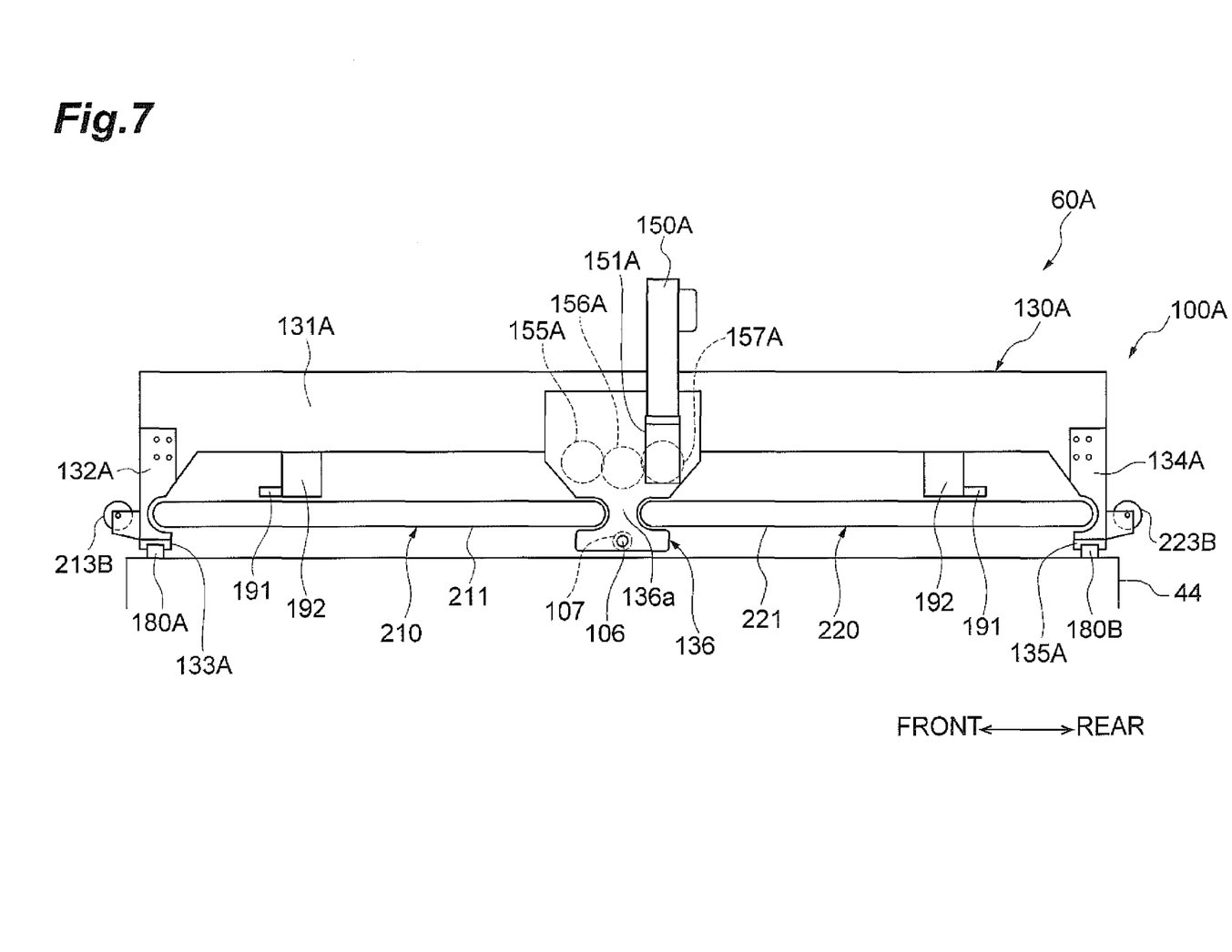
FIG. 7 is a diagram of a left base member of a side-arm transfer unit when viewed from the side.

The conveying surface (i.e., the upper surface of the endless belt 211) of the front conveyor 210 and the conveying surface (i.e., the upper surface of the endless belt 221) of the rear conveyor 220 are the same in height (see FIG. 7). On the front side of the front conveyor 210, rollers 213A and 213B are arranged with a certain gap apart from the front conveyor 210. The roller 213A is supported by the elevating platform 44. The roller 213B is supported by the left side arm 100A. The upper portions of the rotating surfaces of the rollers 213A and 213B are the same in height as the conveying surface of the front conveyor 210. Providing the rollers 213A and 213B enables packages W to be smoothly passed between the front conveyor 210 and the storage sections 24, for example. On the rear side of the rear conveyor 220, rollers 223A and 223B are arranged with a certain gap apart from the rear conveyor 220. The roller 223A is supported by the elevating platform 44. The roller 223B is supported by the left side arm 100A. The upper portions of the rotating surfaces of the rollers 223A and 223B are the same in height as the conveying surface of the rear conveyor 220. Providing the rollers 223A and 223B enables packages W to be smoothly passed between the rear conveyor 220 and the storage sections 34, for example.

(Side Arm)

The left side arm 100A and the right side arm 100B can stretch and retract in the front-and-rear direction (stretching-and-retracting direction) toward and from both sides in the left-and-right direction of a package W as depicted in FIG. 4 and FIGS. 5A to 5C. The right side arm 100B is arranged on the right side of the lower conveyor 200, and is fixed on the elevating platform 44. The left side arm 100A is arranged on the left side of the right side arm 100B. The left side arm 100A moves in the left-and-right direction along a front guide rail 180A and a rear guide rail 180B provided to the elevating platform 44.

Figure 5:
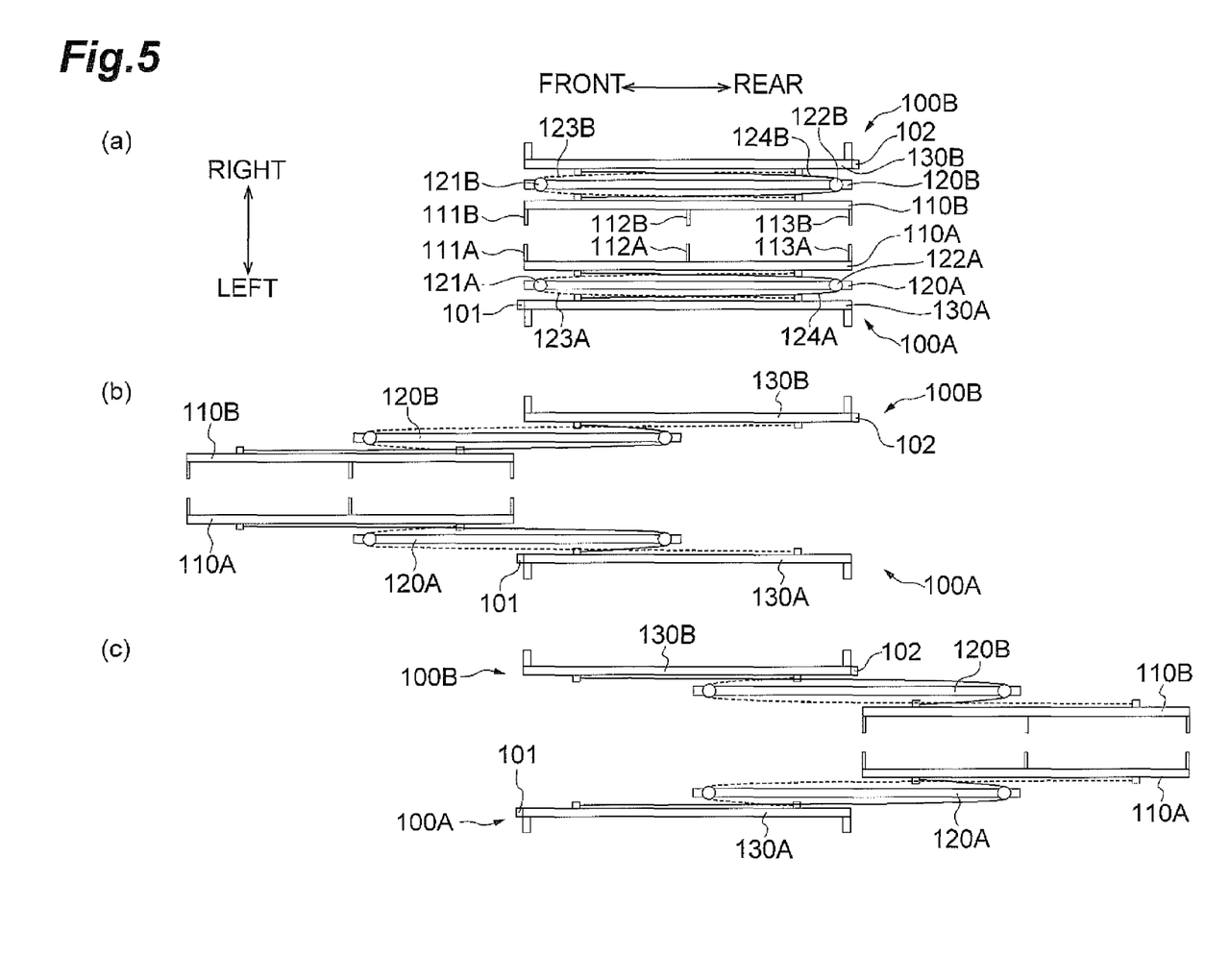
Figure 6:
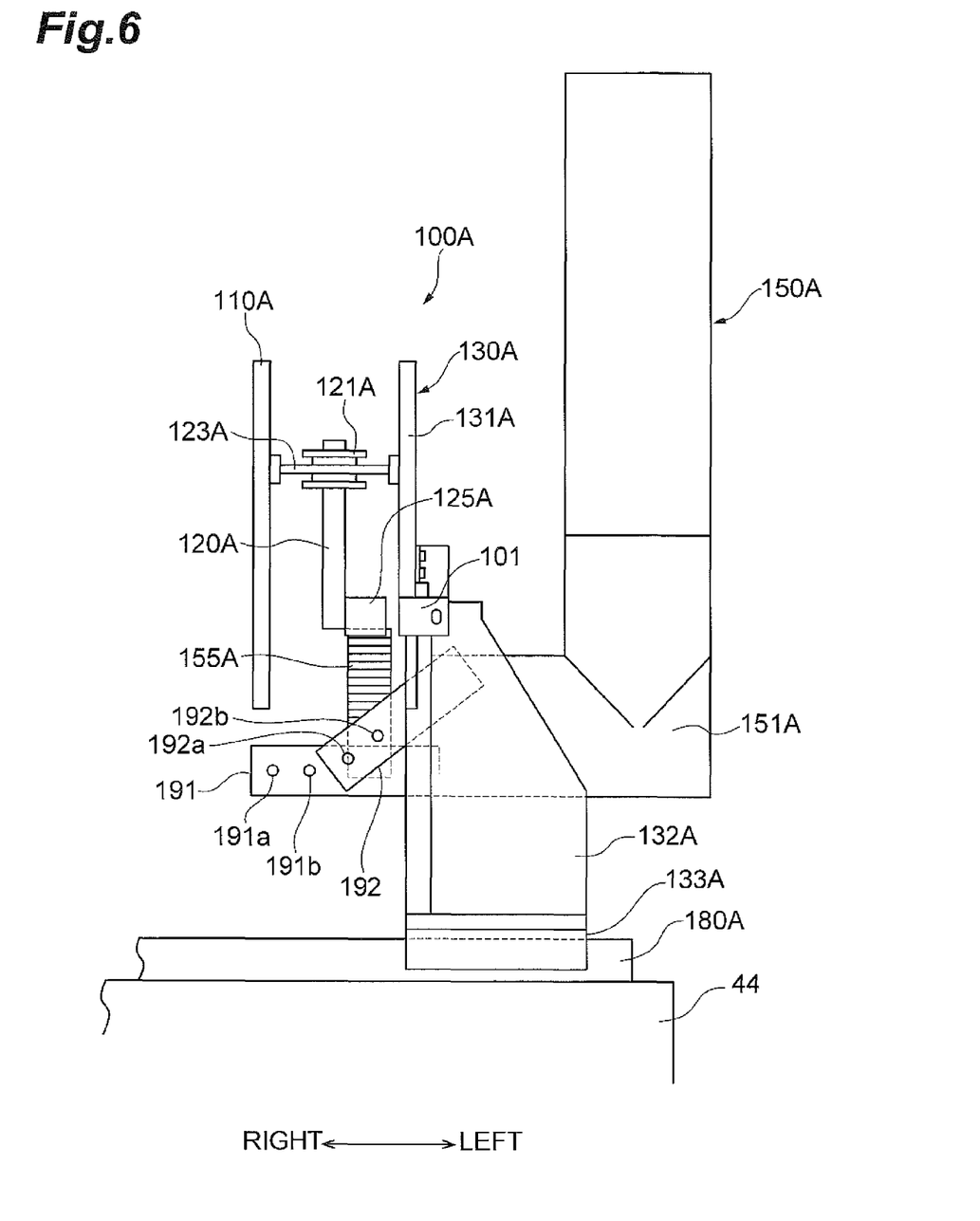
FIG. 6 is a sectional diagram taken along the line VI-VI of FIG. 4.

As depicted in FIGS. 5A and 6, the left side arm 100A includes a left top member (telescopic member) 110A, a left middle member (telescopic member) 120A, and a left base member 130A. The left top member 110A, the left middle member 120A, and the left base member 130A are arranged from the right side toward the left side in this order. The left top member 110A, the left middle member 120A, and the left base member 130A extend in the front-and-rear direction, and have the same length in the front-and-rear direction.

To the left middle member 120A near its front end and near its rear end, a front pulley 121A and a rear pulley 122A are respectively provided. The front pulley 121A and the rear pulley 122A rotate about axes along the height direction of the side-arm transfer unit 60A as rotation axes.

On the left base member 130A near its rear end, one end of a belt 123A is fastened, and on the left top member 110A near its rear end, the other end of the belt 123A is fastened. The belt 123A is looped over the front side of the front pulley 121A. On the left base member 130A near its front end, one end of a belt 124A is fastened, and on the left top member 110A near its front end, the other end of the belt 124A is fastened. The belt 124A is looped over the rear side of the rear pulley 122A. In FIGS. 5A to 5C, to easily distinguish between the belt 123A and the belt 124A, the belt 123A is represented by a broken line for convenience.

When the left middle member 120A is slid forward from the left base member 130A, the left top member 110A is pulled forward by the belt 123A as depicted in FIG. 5B. When the left middle member 120A is slid rearward from the left base member 130A, the left top member 110A is pulled rearward by the belt 124A as depicted in FIG. 5C. In this manner, by causing the left middle member 120A to advance and retreat with respect to the left base member 130A in the front-and-rear direction, the left top member 110A advances and retreats with respect to the left middle member 120A in the front-and-rear direction.

The right side arm 100B includes a right top member (telescopic member) 110B, a right middle member (telescopic member) 120B, a right base member 130B, a front pulley 121B, a rear pulley 122B, a belt 123B, and a belt 124B. Because the right top member 110B, the right middle member 120B, the right base member 130B, the front pulley 121B, the rear pulley 122B, the belt 123B, and the belt 124B are configured the same as the left top member 110A, the left middle member 120A, the left base member 130A, the front pulley 121A, the rear pulley 122A, the belt 123A, and the belt 124A, detail explanation thereof is omitted. The right side arm 100B also stretches and retracts in the front-and-rear direction on the basis of the same mechanism as that of the left side arm 100A.

The left top member 110A is provided with a front hook 111A, a central hook 112A, and a rear hook 113A that can protrude toward the right top member 110B, as depicted in FIGS. 4 and 5A, for example. The front hook 111A is provided to the left top member 110A at its front end. The central hook 112A is provided to the left top member 110A at its center in the front-and-rear direction. The rear hook 113A is provided to the left top member 110A at its rear end. As one example of each of the front hook 111A, the central hook 112A, and the rear hook 113A, one end of a rod-like member is rotatably fixed on the left top member 110A. The other end of the rod-like member can be protruded from the left top member 110A by being rotated toward the right top member 110B, and the other end of the rod-like member can be retracted into the left top member 110A by being rotated toward the left top member 110A. It should be noted that an appropriate mechanism can be used as a mechanism for protruding the front hook 111A, for example.

The right top member 110B is provided with a front hook 111B, a central hook 112B, and a rear hook 113B that can protrude toward the left top member 110A, as depicted in FIGS. 4 and 5A, for example. Because the front hook 111B, the central hook 112B, and the rear hook 113B are respectively configured the same as the front hook 111A, the central hook 112A, and the rear hook 113A that are provided to the left top member 110A, detail explanation thereof is omitted.

The side-arm transfer unit 60A transfers a package W between the side-arm transfer unit 60A and the storage sections 24, for example, by stretching and retracting the left side arm 100A and the right side arm 100B while engaging certain ones of the front hook 111A, the central hook 112A, the rear hook 113A, the front hook 111B, the central hook 112B, and the rear hook 113B with the package W. The package W transferred by the side-arm transfer unit 60A is placed on the front conveyor 210 or the rear conveyor 220.

The side-arm transfer unit 60A can simultaneously transfer two packages W by stretching and retracting the left top member 110A and the right top member 110B in such a state that the packages W exist in the respective two areas: an area between the front hooks 111A and 111B and the central hooks 112A and 112B; and an area between the central hooks 112A and 112B and the rear hooks 113A and 113B.

When a package W is transferred, the front conveyor 210 and the rear conveyor 220 are driven in conjunction with stretching and retracting of the left side arm 100A and the right side arm 100B, whereby the left side arm 100A and the right side arm 100B can be assisted to transfer the package W. When the front conveyor 210 and the rear conveyor 220 are driven, the speed of the front conveyor 210 and the rear conveyor 220 conveying the package W may be set lower than the speed of stretching and retracting the left side arm 100A and the right side arm 100B. In this case, transfer can be performed in such a state that the package W is pressed upon the front hook 111A, for example, that is pushing or pulling the package W. Accordingly, it is possible to prevent a situation that the package W cannot be transferred to a certain position due to the occurrence of slippage at the package W when stretching or retracting of the left side arm 100A and the right side arm 100B is stopped.

As depicted in FIG. 4, on the upper side of the left top member 110A, the left middle member 120A, and the left base member 130A, an upper cover 139A is provided. The upper cover 139A holds a power cable for supplying power to a drive unit that drives the rear hook 113A, for example, and signal wires for various sensors, for example. Similarly to the upper cover 139A, an upper cover 139B is provided also on the side of the right top member 110B, the right middle member 120B, and the right base member 130B. The upper covers 139A and 139B guide the power cable and the signal wires so that no strain would be placed on the power cable and the signal wires, for example, held by the upper covers 139A and 139B when the left side arm 100A and the right side arm 100B stretch and retract.

As depicted in FIGS. 6, 7, 8A, and 8B, on a surface of the left base member 130A on the side of the left middle member 120A, a front pinion gear 155A, a central pinion gear 156A, and a rear pinion gear 157A are rotatably installed with axes along the left-and-right direction as rotation axes. The central pinion gear 156A is provided to the left base member 130A at the center in the front-and-rear direction. The front pinion gear 155A is provided on the front side of the central pinion gear 156A, and the rear pinion gear 157A is provided on the rear side of the central pinion gear 156A. The front pinion gear 155A and the central pinion gear 156A engage with each other, and the central pinion gear 156A and the rear pinion gear 157A engage with each other. In the present embodiment, the front pinion gear 155A, the central pinion gear 156A, and the rear pinion gear 157A have the same number of teeth, and also have the same diameter. However, pinion gears may be used in which at least either ones of the numbers of teeth and the diameters are different from each other.

To the left middle member 120A near its lower end, a left rack gear 125A is provided. The left rack gear 125A extends in the extending direction of the left middle member 120A, i.e., the front-and-rear direction. The teeth side of the left rack gear 125A faces the elevating platform 44. The left rack gear 125A has the same length as that of the left middle member 120A in the front-and-rear direction.

Figure 8:
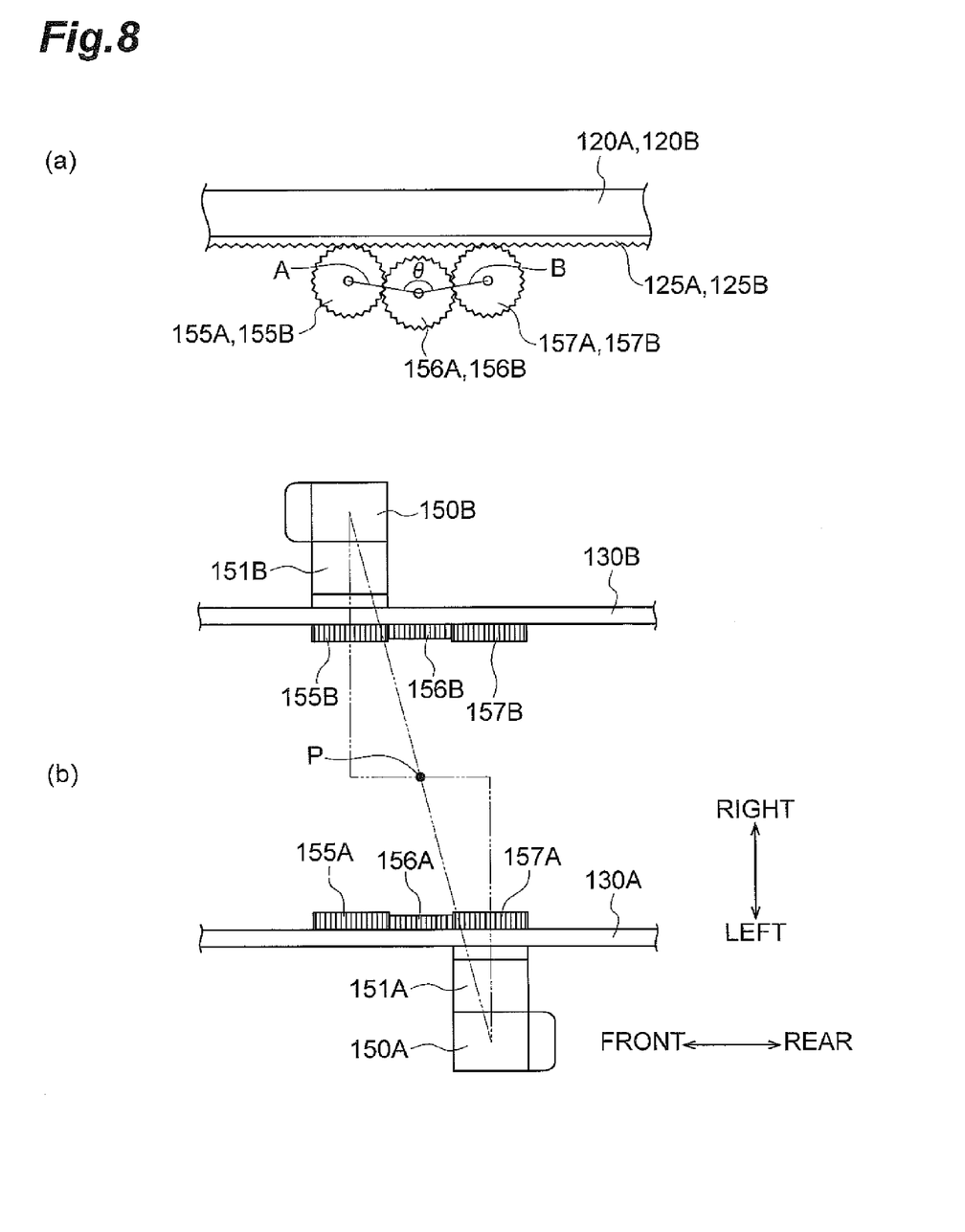

In particular, as depicted in FIG. 8A, the front pinion gear 155A and the rear pinion gear 157A engage with the left rack gear 125A. The central pinion gear 156A is provided at a position lower than the front pinion gear 155A and the rear pinion gear 157A, and does not engage with the left rack gear 125A.

By reducing the amount of lowering the mounting point of the central pinion gear 156A with respect to the mounting position of the front pinion gear 155A, for example, space occupied by the front pinion gear 155A, the central pinion gear 156A, and the rear pinion gear 157A in the vertical direction (height direction of the transferring apparatus 6) can be reduced. This reduced space enables the size of the left base member 130A in the height direction to be smaller. In other words, θ is preferably a value closer to 180 degrees, where θ is an angle formed by a segment A that connects the rotation axis of the front pinion gear 155A to the rotation axis of the central pinion gear 156A and a segment B that connects the rotation axis of the central pinion gear 156A to the rotation axis of the rear pinion gear 157A.

On the surface opposite to the surface on which the front pinion gear 155A, for example, is mounted in the left base member 130A, a motor 150A is installed with an adapter 151A interposed therebetween. The motor 150A is arranged so that the rotating shaft is aligned along the height direction of the side-arm transfer unit 60A (see FIG. 6). The adapter 151A is attached to the distal end of the rotating shaft of the motor 150A. The adapter 151A changes the direction of the rotating shaft of the motor 150A by 90 degrees so that the rotating shaft of the motor 150A is directed in the left-and-right direction. The motor 150A is installed in a position posterior to the center of the left base member 130A. The drive force of the motor 150A is transmitted to the rear pinion gear 157A via the adapter 151A.

When the rear pinion gear 157A is rotationally driven by the motor 150A, the central pinion gear 156A and the front pinion gear 155A are also rotated, so that the left middle member 120A is driven in the front-and-rear direction by the rear pinion gear 157A and the front pinion gear 155A. The left middle member 120A is thus driven by the motor 150A, whereby the left top member 110A and the left middle member 120A advance and retreat with respect to the left base member 130A.

The right base member 130B is provided with a front pinion gear 155B, a central pinion gear 156B, a rear pinion gear 157B, a motor 150B, and an adapter 151B. Because the front pinion gear 155B, the central pinion gear 156B, the rear pinion gear 157B, the motor 150B, and the adapter 151B are configured the same as the front pinion gear 155A, the central pinion gear 156A, the rear pinion gear 157A, the motor 150A, and the adapter 151A, detail explanation thereof is omitted.

As depicted in FIG. 8A, the front pinion gear 155B and the rear pinion gear 157B engage with the right rack gear 125B provided to the right middle member 120B. Because the right rack gear 125B is configured the same as the left rack gear 125A, detail explanation thereof is omitted.

As depicted in FIG. 8B, the motor 150A and the motor 150B are arranged outside an area between a pair of the left base member 130A and the right base member 130B. The motor 150B herein is installed in a position anterior to the central position of the right base member 130B. The drive force of the motor 150B is transmitted to the front pinion gear 155B via the adapter 151 B. In other words, in the present embodiment, the motor 150A and the motor 150B are connected to pinion gears (herein, the rear pinion gear 157A and the front pinion gear 155B) that are point-symmetrical, when viewed from the height direction of the side-arm transfer unit 60A, with respect to the center P of positions where the front pinion gears 155A and 155B, the central pinion gears 156A and 156B, and the rear pinion gears 157A and 157B that are provided to the pair of left base member 130A and the right base member 130B.

The side-arm transfer unit 60B is configured the same as the side-arm transfer unit 60A, in which the motor 150A provided to the left side arm 100A is connected to the rear pinion gear 157A, and the motor 150B provided to the right side arm 100B is connected to the front pinion gear 155B. Accordingly, as depicted in FIG. 4, the motor 150B and the motor 150A that are positioned between the right side arm 100B of the side-arm transfer unit 60A and the left side arm 100A of the side-arm transfer unit 60B are connected to pinion gears whose positions in the front-and-rear direction are different from each other.

As depicted in FIGS. 5A and 6, the front end of the left base member 130A of the left side arm 100A is provided with a front proximity sensor 101. The front proximity sensor 101 detects the left rack gear 125A provided to the left middle member 120A as a magnetic body to be detected. Specifically, the front proximity sensor 101 detects a state in which the left rack gear 125A faces a detector plane on the right side of the front proximity sensor 101 as an ON state, and detects a state in which the left rack gear 125A does not face the detector plane on the right side of the front proximity sensor 101 as an OFF state.

The rear end of the right base member 130B of the right side arm 100B is provided with a rear proximity sensor 102. The rear proximity sensor 102 detects the right rack gear 125B provided to the right middle member 120B as a magnetic body to be detected. Specifically, the rear proximity sensor 102 detects a state in which the right rack gear 125B faces a plane on the left side of the rear proximity sensor 102 as an ON state, and detects a state in which the right rack gear 125B does not face the plane on the left side of the front proximity sensor 102 as an OFF state.

As depicted in FIG. 5A, the front proximity sensor 101 is attached to the front end of the left base member 130A, and the rear proximity sensor 102 is attached to the rear end of the right base member 130B. Accordingly, the length of the left rack gear 125A and the right rack gear 125B in the front-and-rear direction is shorter than the length between the front proximity sensor 101 and the rear proximity sensor 102 in the front-and-rear direction.

As depicted in FIG. 4, the side-arm transfer unit 60A is provided with a determination unit 103. The determination unit 103 determines a stretching direction indicating which side in the front-and-rear direction the left side arm 100A and the right side arm 100B are stretching on the basis of detection results of the front proximity sensor 101 and the rear proximity sensor 102. The position where the determination unit 103 is provided is not limited to the position near the left side arm 100A depicted in FIG. 4, and may be provided at any appropriate position.

As depicted in FIG. 5A, when the left side arm 100A and the right side arm 100B are in a state of not stretching, both of the front proximity sensor 101 and the rear proximity sensor 102 are in the OFF state. Accordingly, the determination unit 103 determines that both of the left side arm 100A and the right side arm 100B are in the state of not stretching.

As depicted in FIG. 5B, when the left side arm 100A and the right side arm 100B are in a state of stretching forward, the front proximity sensor 101 is in the ON state and the rear proximity sensor 102 is in the OFF state. Accordingly, the determination unit 103 determines that both of the left side arm 100A and the right side arm 100B are in the state of stretching forward.

As depicted in FIG. 5C, when the left side arm 100A and the right side arm 100B are in a state of stretching rearward, the front proximity sensor 101 is in the OFF state and the rear proximity sensor 102 is in the ON state. Accordingly, the determination unit 103 determines that both of the left side arm 100A and the right side arm 100B are in the state of stretching rearward.

Without providing a proximity sensor to both ends in the front-and-rear direction of the left base member 130A or to both ends in the front-and-rear direction of the right base member 130B, by providing the front proximity sensor 101 and the rear proximity sensor 102 to the front end of the left base member 130A and the rear end of the right base member 130B, respectively, as in the present embodiment, which direction the left side arm 100A and the right side arm 100B are stretching can be detected for both directions of the front direction and the rear direction.

The front proximity sensor 101 for detecting that the arms are stretching forward is attached to the left base member 130A, and the rear proximity sensor 102 for detecting that the arms are stretching rearward is provided to the right base member 130B. Accordingly, the front proximity sensor 101 can be used as a sensor for detecting whether the left base member 130A is operating, and the rear proximity sensor 102 can be used as a sensor for detecting the right base member 130B is operating. For example, if the front proximity sensor 101 and the rear proximity sensor 102 are provided to the left base member 130A, an additional sensor for detecting whether the right base member 130B is operating needs to be provided, but this is not required in the present embodiment.

As depicted in FIG. 7, the left base member 130A includes a base body member 131A, a front guide leg-member 132A, a front guide block 133A, a rear guide leg-member 134A, a rear guide block 135A, a movement leg-member 136, and a nut 107 (see FIG. 4).

The base body member 131A extends in the front-and-rear direction to support the left middle member 120A and the left top member 110A, for example. The front guide leg-member 132A and the rear guide leg-member 134A are respectively provided to both ends in the front-and-rear direction of the base body member 131A. The front guide leg-member 132A and the rear guide leg-member 134A each extend downward from the base body member 131A. In the front-and-rear direction, between the front guide leg-member 132A and the rear guide leg-member 134A, the front conveyor 210 and the rear conveyor 220 are provided.

The front guide leg-member 132A has a shape that does not interfere with the front conveyor 210 when viewed from the left-and-right direction. The rear guide leg-member 134A has a shape that does not interfere with the rear conveyor 220 when viewed from the left-and-right direction.

The front guide block 133A is attached to the lower end of front guide leg-member 132A. The front guide block 133A slidably engages with the front guide rail 180A provided to the elevating platform 44. The rear guide block 135A is attached to the lower end of rear guide leg-member 134A. The rear guide block 135A slidably engages with the rear guide rail 180B.

The front guide rail 180A and the rear guide rail 180B are provided on the upper surface of the elevating platform 44. The front guide rail 180A is provided near the front end of the upper surface of the elevating platform 44, and extends in the left-and-right direction. The rear guide rail 180B is provided near the rear end of the upper surface of the elevating platform 44, and extends in the left-and-right direction.

The movement leg-member 136 is provided between the front guide leg-member 132A and the rear guide leg-member 134A. The movement leg-member 136 is mounted on the base body member 131A at the center in the front-and-rear direction, and extends to a point on the lower side of the endless belt 211 of the front conveyor 210 and the endless belt 221 of the rear conveyor 220. The movement leg-member 136 has a constricted portion 136a whose length in the front-and-rear direction is constricted so that no interference occurs between the endless belt 211 and the endless belt 221 when viewed from the left-and-right direction.

The nut 107 is attached to the lower end of the movement leg-member 136. In other words, the nut 107 is in a position lower than the endless belt 211 and the endless belt 221.

As depicted in FIG. 4, the right base member 130B of the right side arm 100B is provided with the motor 105. Between the left base member 130A and the right base member 130B, a ball screw 106 is disposed across. One end of the ball screw 106 is connected to the rotating shaft of the motor 105, and the other end thereof is threadably engaged with the nut 107. The ball screw 106 is arranged along the left-and-right direction similarly to the front guide rail 180A and the rear guide rail 180B.

Because the right base member 130B is fixed on the elevating platform 44, when the ball screw 106 is rotated by the motor 105, the nut 107 threadably engaging with the ball screw 106 moves along the extending direction of the ball screw 106. Thus, when the ball screw 106 is rotated by the motor 105, the left base member 130A moves in the left-and-right direction while being guided by the front guide rail 180A and the rear guide rail 180B.

Because the distance between the left base member 130A and the right base member 130B can be adjusted, in accordance with the size in the left-and-right direction of a package W to be conveyed, the distance between the left side arm 100A and the right side arm 100B can be adjusted.

As depicted in FIGS. 6 and 7, to the left base member 130A near its front end, a first light-emitting sensor 191 and a second light-emitting sensor 192 are provided. The first light-emitting sensor 191 and the second light-emitting sensor 192 are fixed on the base body member 131A. The first light-emitting sensor 191 and the second light-emitting sensor 192 are arranged above the endless belt 211 of the front conveyor 210. The first light-emitting sensor 191 and the second light-emitting sensor 192 detect a package W that exists on the front side of the side-arm transfer unit 60A. Distances to a package W that the first light-emitting sensor 191 and the second light-emitting sensor 192 detect are different from each other.

The first light-emitting sensor 191 emits light from a light-emitting portion 191a, and receives light reflected by a package W at a light-receiving portion 191b. The second light-emitting sensor 192 emits light from a light-emitting portion 192a, and receives light reflected by the package W at a light-receiving portion 192b. Cases of the first light-emitting sensor 191 and the second light-emitting sensor 192 partially overlap each other in the height direction of the side-arm transfer unit 60A when viewed from the front-and-rear direction. Because the overlapping part is different from the positions where the light-emitting portions 191a and 192a and the light-receiving portions 191b and 192b are provided, functions of the first light-emitting sensor 191 and the second light-emitting sensor 192 will not be impaired.

The first light-emitting sensor 191 and the second light-emitting sensor 192 are additionally provided to the left base member 130A near the rear end. The first light-emitting sensor 191 and the second light-emitting sensor 192 herein detect a package W that exists on the rear side of the side-arm transfer unit 60A. Because the first light-emitting sensor 191 and the second light-emitting sensor 192 provided near the rear end of the left base member 130A are configured the same as the first light-emitting sensor 191 and the second light-emitting sensor 192 provided near the front end of the left base member 130A, detail explanation thereof is omitted. In the same manner as the left base member 130A, also to the right base member 130B, the first light-emitting sensor 191 and the second-light emitting sensor 192 are provided in each position of the front end and the rear end of the right base member 130B.

The present embodiment is configured as described above, where the lower conveyor 200 is provided below the base body member 131A between the front guide leg-member 132A and the rear guide leg-member 134A, so that the left top member 110A, the left middle member 120A, and the left base member 130A pass above the lower conveyor 200 when the left side arm 100A is moved in the left-and-right direction. Accordingly, the distance between the left side arm 100A and the right side arm 100B can be changed in accordance with the size of a package W, for example, without being limited by the lower conveyor 200, so that the movable range of the left side arm 100A can be widened.

Because the front guide leg-member 132A and the rear guide leg-member 134A that support the left side arm 100A are provided to both ends in the stretching-and-retracting direction of the base body member 131A, the package W can be stably transferred without the left side arm 100A being bent when the package W is transferred.

The ball screw 106 is provided below the endless belt 211 and the endless belt 221 between the front conveyor 210 and the rear conveyor 220. This makes it possible to shorten the length in the front-and-rear direction of the constricted portion 136a of the movement leg-member 136 between the front conveyor 210 and the rear conveyor 220. Thus, the front conveyor 210 and the rear conveyor 220 can be arranged closer to each other. This closer arrangement also enables the conveying surfaces of the front conveyor 210 and the rear conveyor 220 to be closer to each other, so that a package W can be smoothly passed between the front conveyor 210 and the rear conveyor 220.

The cases of the first light-emitting sensor 191 and the second light-emitting sensor 192 are arranged so as to partially overlap each other in the vertical direction when viewed from the front-and-rear direction. This arrangement enables the first light-emitting sensor 191 and the second light-emitting sensor 192 to be arranged in a smaller space in the vertical direction than when the first light-emitting sensor 191 and the second light-emitting sensor 192 are arranged so as not to overlap each other in the vertical direction. Thus, the vertical size of the left side arm 100A and the right side arm 100B each provided with the first light-emitting sensor 191 and the second light-emitting sensor 192 can be reduced.

One embodiment of the present invention has been described in the foregoing, but the present invention is not limited to the above-described embodiment. For example, it has been assumed in the embodiment that three pinion gears are used to drive the middle member of each side arm as depicted in FIG. 8A, but three or more (e.g., five) pinion gears may be used.

It has been assumed that the only left side arm 100A is movable in the left-and-right direction, but the right side arm 100B may be movable in the left-and-right direction in the same manner as the left side arm 100A.

It has been assumed that packages W are hooked by the hooks 111A to 113A and 111B to 113B to be transferred, but the left top member 110A and the right top member 110B may be configured to catch and transfer the packages W.

It has been assumed that the transferring apparatus 6 includes the side-arm transfer unit 60A and the side-arm transfer unit 60B, but the transferring apparatus 6 may include only either one of the side-arm transfer units. The transferring apparatus 6 may include three or more side-arm transfer units.

It has been assumed that each of the left side arm 100A and the right side arm 100B is configured with three members (base member, middle member, top member), but the function of the top member may be imparted to the middle member to omit the top member, and each of the side arms may be configured with the base member and the middle member, for example. In place of the top member and the middle member, a telescopic member that stretches and retracts by another mechanism may be provided.

INDUSTRIAL APPLICABILITY

According to one aspect of the present invention, the movable range of side arms can be widened.

REFERENCE SIGNS LIST

1 . . . automated warehouse, 6 . . . transferring apparatus, 44 . . . elevating platform (body portion), 60A, 60B . . . side-arm transfer unit, 100A . . . left side arm, 100B . . . right side arm, 101 . . . front proximity sensor, 102 . . . rear proximity sensor, 103 . . . determination unit, 105 . . . motor, 106 . . . ball screw, 107 . . . nut, 110A . . . left top member (telescopic member), 110B . . . right top member (telescopic member), 120A . . . left middle member (telescopic member), 120B . . . right middle member (telescopic member), 125A . . . left rack gear, 125B . . . right rack gear, 130A . . . left base member, 130B . . . right base member, 131A . . . base body member, 132A . . . front guide leg-member, 133A . . . front guide block, 134A . . . rear guide leg-member, 135A . . . rear guide block, 136 . . . movement leg-member, 150A, 150B . . . motor, 155A, 155B . . . front pinion gear, 156A, 156B . . . central pinion gear, 157A, 157B . . . rear pinion gear, 191 . . . first light-emitting sensor, 192 . . . second light-emitting sensor, 200 . . . lower conveyor, W . . . package (object to be conveyed).

The invention claimed is:

1. A transferring apparatus comprising:
a body portion;
a pair of side arms that are placed on the body portion and are each capable of stretching toward and retracting from both sides of an object to be conveyed; and
two lower conveyors that are placed on the body portion,
wherein at least either one of the pair of the side arms is movable in a left-and-right direction orthogonal to a stretching-and-retracting direction of the side arms,
and wherein the at least either one of the pair of side arms that is movable in the left-and-right direction includes a base member that is movable in the left-and-right direction and a telescopic member that advances from and retreats to the base member in the stretching-and-retracting direction,
the base member comprises:
a base body member that supports the telescopic member;
guide leg-members that are provided to respective ends in the stretching-and-retracting direction of the base body member on the lower side thereof;
guide blocks that are attached to the guide leg-members;
a movement leg-member that is provided to the base body member on the lower side thereof between the guide leg-members; and
a nut provided to the movement leg-member, the body portion comprises:
guide rails that are provided to respective ends in the stretching-and-retracting direction of the body portion, extend in the left-and-right direction, and slidably engage with the guide blocks;
a screw that is provided between the guide rails, extends in the left-and-right direction, and threadably engages with the nut; and
a motor that is connected to the screw,
the two lower conveyors are provided below the base body member between the guide leg-members,
wherein the entire two lower conveyors are located between the guide leg-members,
wherein the movement leg-member is between the two lower conveyors,
wherein the movement leg-member comprises a constricted portion at a point where the two lower conveyors are in closest proximity to one another, and
wherein the screw is below and between the lower conveyors.

2. The transferring apparatus according to claim 1, wherein the lower conveyor is provided in a quantity of two with the movement leg-member interposed therebetween along the stretching-and-retracting direction, and the screw is provided below and between the lower conveyors.

3. The transferring apparatus according to claim 1, wherein
each of the side arms is provided with two light-emitting sensors, and
cases of the two light-emitting sensors partially overlap each other in a vertical direction when the light-emitting sensors are viewed from the stretching-and-retracting direction.

* * * * *